US012589557B2

(12) United States Patent (10) Patent No.: US 12,589,557 B2

Piana et al. (45) Date of Patent: Mar. 31, 2026

(54) SELF-RISING BOARD MOLDING

(71) Applicant: PIANA NONWOVENS, LLC., Cartersville, GA (US)

(72) Inventors: Andrea Piana, Cartersville, GA (US); Andy Hollis, Cartersville, GA (US); Mehran Jafari, Cartersville, GA (US); Helias Andriessen, Cartersville, GA (US); Sang-hoon Lim, Cartersville, GA (US); Eric McCann, Cartersville, GA (US)

(73) Assignee: PIANA NONWOVENS, LLC., Cartersville, GA (US)

( * ) Notice: Subject to any disclaimer, the term of this patent is extended or adjusted under 35 U.S.C. 154(b) by 21 days.

(21) Appl. No.: 18/644,909

(22) Filed: Apr. 24, 2024

(65) Prior Publication Data

US 2025/0121567 A1 Apr. 17, 2025

Related U.S. Application Data

(63) Continuation of application No. 17/814,555, filed on Jul. 25, 2022, now Pat. No. 11,993,027, which is a (Continued)

(51) Int. Cl.
B29C 70/12 (2006.01)
B29C 70/34 (2006.01)
(Continued)

(52) U.S. Cl.
CPC .............. B29C 70/12 (2013.01); B29C 70/34 (2013.01); B29C 70/545 (2013.01); B29K 2267/00 (2013.01); B29L 2031/751 (2013.01)

(58) Field of Classification Search
CPC ....... B29C 70/12; B29C 70/34; B29C 70/545; B29K 2267/00; B29L 2031/751
(Continued)

(56) References Cited

U.S. PATENT DOCUMENTS

| 3,607,500 A | 9/1971 | Field |
| 3,621,092 A | 11/1971 | Hofer |
| | (Continued) | |

FOREIGN PATENT DOCUMENTS

| DE | 10 2012 105 425 A1 | 12/2013 |
| EP | 0404032 A1 * | 12/1990 |
| | (Continued) | |

OTHER PUBLICATIONS

Kim et al., "Preparation of Textile Nonwoven Foams Using Elastomeric Binder Fibers for Automotive Cushioning Materials", Sen'i Gakkaishi, vol. 69, No. 2, (2013).

*Primary Examiner* — Michael N Orlando
(74) *Attorney, Agent, or Firm* — WCF IP

(57) ABSTRACT

Expandable substrates, which are referred to as blanks, are created by compressing thermobonded nonwovens after heating the binder material above its melting temperature, and then cooling the compressed nonwovens so that the binder material hardens and holds the fibers of the nonwoven together in a compressed configuration with stored kinetic energy. A mold for the component to be manufactured can be partially filled with a number of boards (or blanks) in a stacked, vertically, adjacent or even random orientation. Upon application of heat to the boards or blanks or parts in the mold, the binder material is melted so as to allow the nonwoven material to expand in one or more directions, and thereby fill all or part of the mold. Upon cooling, the binder material again hardens, and the molded component is retrieved from the mold.

4 Claims, 5 Drawing Sheets

Related U.S. Application Data continuation of application No. 16/594,279, filed on Oct. 7, 2019, now Pat. No. 11,472,132.

(60) Provisional application No. 62/879,029, filed on Jul. 26, 2019, provisional application No. 62/837,235, filed on Apr. 23, 2019, provisional application No. 62/820,294, filed on Mar. 19, 2019.

(51) Int. Cl.
| | |
|---|---|
| *B29C 70/54* | (2006.01) |
| *B29K 267/00* | (2006.01) |
| *B29L 31/00* | (2006.01) |

(58) Field of Classification Search
USPC ........................................................ 156/242
See application file for complete search history.

(56) References Cited

U.S. PATENT DOCUMENTS

| | | | |
|---|---|---|---|
| 3,684,645 | A | 8/1972 | Temple et al. |
| 3,850,723 | A | 11/1974 | Ackley |
| 4,643,940 | A | 2/1987 | Shaw et al. |
| 5,143,779 | A * | 9/1992 | Newkirk ............ D04H 1/439 18 442/364 |
| 5,492,580 | A | 2/1996 | Frank |
| 5,505,815 | A | 4/1996 | Yoshida et al. |
| 5,741,380 | A | 4/1998 | Hoyle et al. |
| 6,008,149 | A * | 12/1999 | Copperwheat .......... B32B 5/022 442/388 |
| 6,534,145 | B1 * | 3/2003 | Boyles ................... B60N 3/048 428/92 |
| 11,780,177 | B2 | 10/2023 | Hollis et al. |
| 2004/0180177 | A1 * | 9/2004 | Ray .......................... D04H 1/76 428/95 |
| 2007/0116795 | A1 | 5/2007 | Sayers et al. |
| 2010/0147621 | A1 | 6/2010 | Gillette |
| 2012/0181716 | A1 | 7/2012 | Brentrup et al. |
| 2015/0145160 | A1 | 5/2015 | Jones et al. |
| 2016/0362547 | A1 | 12/2016 | Reuben |

FOREIGN PATENT DOCUMENTS

| | | |
|---|---|---|
| EP | 0 538 047 A1 | 4/1993 |
| EP | 0 708 191 A2 | 4/1996 |
| WO | 2018/108674 A1 | 6/2018 |

* cited by examiner

SELF-RISING BOARD MOLDING

CROSS-REFERENCE TO RELATED APPLICATIONS

This application claims priority to U.S. Provisional Application 62/879,029 filed Jul. 26, 2019, U.S. Provisional Application 62/837,235 filed Apr. 23, 2019, and U.S. Provisional Application 62/820,294 filed Mar. 19, 2019. The complete contents of each application is incorporated herein by reference.

FIELD OF THE INVENTION

The invention is generally related to molding three dimensional objects or portions thereof, and is particularly related to a process which utilizes compressed nonwoven materials as expandable substrates within a mold, as well as the production of a variety of components including seats (car seats, airplane seats, seats in boats, office seats, and other furniture), mattresses, etc. from these expandable substrates in a stream lined production process. Furthermore, aspects of the invention include providing components with tailored properties by molding the expandable substrates together with other components or in varying configurations and according to varying recipes.

BACKGROUND OF THE INVENTION

Polyurethane (PU) is a thermoset plastic that is the product of the reaction of isocyanate and polyol in its simplest form. Other components enter in the reaction for various reasons. For example, catalysts, blowing agents, chain extenders, cross-linkers, pigments, and fillers amongst others can be used to tailor the end-product to the customer's needs. The mixed components are poured in a cavity, either totally or partially closed, that will give the shape to the final polyurethane product.

Polyurethane (PU) foams have been used for many years as the cushioning material in car seats, mattresses, furniture, etc. These materials have cost, manufacturing, and other advantages. However, there have been efforts to replace polyurethane foams with textile nonwoven materials. Textile nonwoven materials (referred to as "nonwovens") have advantages in weight, costs, and performance. By performance, for example, have a nonwoven near the person, i.e., adjacent his or her back or buttocks in a car seat, adjacent the person's body in a mattress, etc., provides a more comfortable feel to the person, e.g., it tends to be "cooler" since air can pass through the non-woven, so that the person does not sweat as much. In addition, the nonwoven can provide advantages in terms of "hardness" and better supporting factors, making the nonwoven material relatively more comfortable to sit or lay on than a PU foam.

The production of polyurethanes in general possesses health, safety and environmental impacts that cannot be neglected. The National Toxicology Program from the Department of Health and Human Services lists toluene diisocyanates (TDI, CAS No. 26471-62-5) as "reasonably anticipated to be a human carcinogen".[1] Toluene diisocyanates "are used primarily to manufacture flexible polyurethane foams for use in furniture, bedding, and automotive and airline seats".[1] The production of polyurethane also has various hazardous air pollutants emission points that need to be dealt with.[2] Hence, the processing of polyurethane has a few environmental and safety compliance requirements that can be a turn off in this environmentally conscious era.

On the other hand, there is a growing demand for flexible three-dimensional polyurethane molded parts. These vary for example from seating for automotive, aerospace, marine and furniture, to specific components in bedding and the before mentioned industry sectors. Their use is only limited by the designer's imagination as polyurethane can be tailored to end-user specifications quite easily.

In the upholstery and mattress industry for example, foam density and indentation load deflection (ILD) are important characteristics that an end-user must be conscious of. The same is translatable to the automotive, marine and aerospace seating domain, but with the added constraint of weight reduction due to fuel consumption.

SUMMARY OF THE INVENTION

An object of the invention is to provide a new methodology for making molded components including but not limited to bedding, furniture, automotive seats, airplane seats, boat seats, etc.

Another object of the invention is to utilize nonwoven materials in the manufacture of molded three dimensional objects such as bedding, furniture, automotive seats, airplane seats, boat seats, etc.

While nonwoven materials have been widely used in the bedding, furniture and automotive industries, the inventors have developed a manufacturing/molding process which allows for the efficient and low cost manufacturing of such three dimensional objects using compressed blanks or boards or cut parts formed from nonwovens. The compressed blanks or boards or cut parts are expandable substrates. They may be stacked, placed vertically, or be randomly distributed in a mold. They may also be laminated to non-expandable substrates and be distributed in the mold. Upon application of heat to a temperature above the melting temperature of the binder material, the expandable substrates expand to fill all or part of the mold. After application of heat, the three dimensional object is cooled within the mold, thereby allowing the binder material to harden. The process thus produces at least one object with a shape that at least partially assumes a configuration defined by the mold.

In some embodiments, a steel or wood frame may be placed in the mold with the expandable substrates. Upon formation of the three dimensional object, the three dimensional object will be adhered or otherwise joined to the steel or wood frame. This methodology may, for example, be used to produce car seats (backs or bases), or seats for trains, planes, and boats. Similarly, this methodology may, for example, be used to produce bedding (e.g., mattresses) with the molded, cushion like nonwoven part being positioned for a person to lay on, and with the frame embedded therein.

The methodology allows for tailoring the attributes of the three dimensional object to be produced in any desired fashion. For example, depending on the "recipe", as determined by the constituents of the expandable substrates used in the mold, different bedding or seating firmness or softness can be produced. For example, laminated boards with a more expandable layer of nonwoven material can be placed at the top of a mold in order to produce a surface layer of a seat or bed which a person comes in contact with that is softer and "cooler" due to the ability of air to flow through an expanded non-woven material.

The methodology may be used to make three dimensional objects of almost any size and shape. The only limitation appears to be in the shape of the mold itself.

In an exemplary embodiment, a three dimensional object is formed by the following process. A nonwoven material is formed into blanks. By compressing the nonwoven under pressure after melting the binder material. Application of heat during the compressing process can be done using hot air, ovens, coils, or other means for applying heat energy. While in its compressed state, the nonwoven is cooled in order for the binder material to re-harden. This may be accomplished simply by removing the heat and/or by blowing cool air through the blanks. The blanks thus formed will typically have a height dimension substantially less than the nonwoven starting material (e.g., ½ to ⅒ as thick; however, differing thicknesses may be used, with the chief requirement being that the compressed dimension is at least smaller than the original dimension of the nonwoven (be it height, width, or length)). If desired, the blanks can be laminated together to form boards. Or the blanks can be laminated together with non-expandable materials such as foams, fabric (e.g., knitted material), rubber, metal, metal alloy, ceramic, and paper materials. If desired, these boards may be cut to form parts which have specific sizes and shapes with a CNC machine, milling machine, scissors, or other suitable device. The blanks, boards, or parts are all expandable substrates. In some applications, the expandable substrates can be deposited in a mold which is to mold the shape of the desired three dimensional object. The advantage of precisely cut parts is that the fabricator can stack the parts in the mold in an orderly fashion so that upon heating the mold may be filled (or at least partially filled in a desired area) by an expanded substrate. However, in other applications, a certain number of boards might simply be randomly dropped into the mold. Depending on the specifications of the fabricator, the expandable substrates may be placed in the mold in particular orders so as to achieve various attributes for the three dimensional objects once it is made. These particular orders, as well as the selection of the nonwoven material that is compressed, as well as any non-expandable material to be incorporated in the mold can be considered a "recipe" which will result in the production of three dimensional objects with tailored attributes. For example, different recipes would be used for producing firm or soft mattresses or firm or soft seating. As discussed above, a frame or other device, or simply other materials, e.g., a metal support screen, etc. may also be incorporated into the mold, such that the three dimensional object, once fabricated, adheres to or is otherwise connected to the frame, device, or material. After the mold is partially filled with the expandable substrates, the mold is heated. Application of heat softens (i.e., melts) the binder material which, in turn, allows the stored kinetic energy of the fiber to be released. That is, the fiber expands in at least one dimension (the dimension it was compressed) back towards its original configuration in the nonwoven material prior to compression of the non-woven. Depending on the fullness of the mold, the expandable substrate will expand to fill the inside of the mold, and, will adopt the contours of the mold (e.g., flat surfaces, curved surfaces, etc.). After expansion, the mold can be cooled (e.g., by application of cool air or otherwise), and the three dimensional object may be retrieved from the mold.

BRIEF DESCRIPTION OF THE DRAWINGS

FIG. 5a shows a board without non-expanding layers, and FIG. 5b shows a board with one or more non-expanding layers.

DETAILED DESCRIPTION

Figures 1, 2:
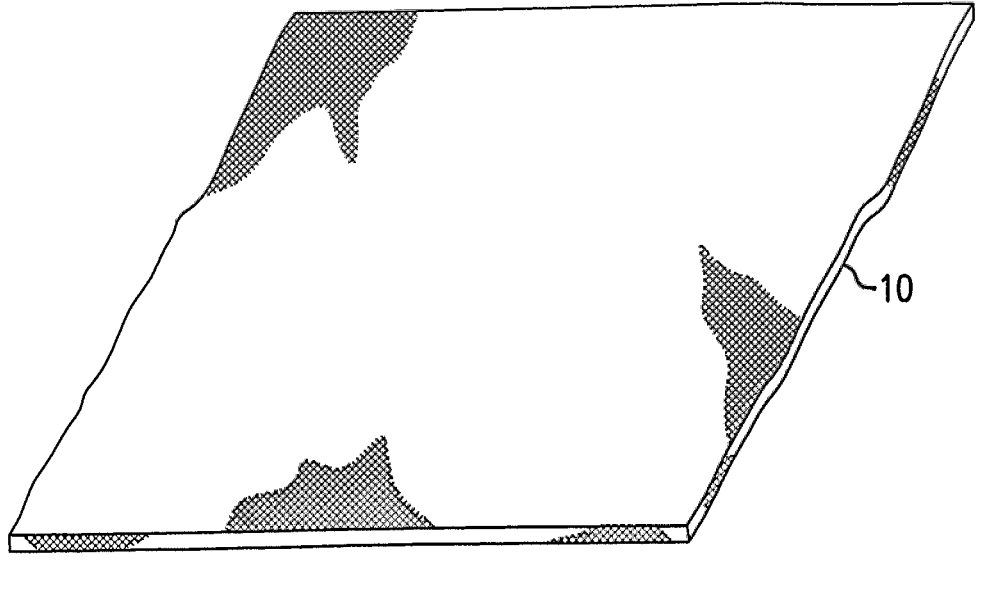
FIG. 1 is an exemplary isometric view of a fibrous nonwoven material.
FIG. 2 is an exemplary side view of a vertically lapped fibrous nonwoven material

FIG. 1 shows an example of a nonwoven 10 material. In particular, this invention pertains to the use of what are often termed thermobonded nonwoven materials, where a fibrous mass (i.e., one that is not "knitted" or "woven") has adjacent fibers joined together at varying locations by binder material. The nonwoven 10 has height, width, and length dimensions (i.e., it is three dimensional in character). A "nonwoven" is a manufactured sheet, web, or batt of natural and/or man-made fibers or filaments that are bonded to each other by any of several means. Manufacturing of nonwoven products is well described in "Nonwoven Textile Fabrics" in Kirk-Othmer Encyclopedia of Chemical Technology, 3rd Ed., Vol. 16, July 1984, John Wiley & Sons, p. 72.about. 124 and in "Nonwoven Textiles", November 1988, Carolina Academic Press. Nonwovens are commercially available from a number of manufacturers.

FIG. 2 shows an example of a vertically lapped nonwoven 12 material. Vertical lapping may be performed using methods known in the art, e.g. as set forth in US 2008/0155787 and U.S. Pat. No. 7,591,049, each of which is incorporated herein by reference. Vertically lapped nonwovens are commercially available from a number of sources. Because of the configuration of the lapping, such as is shown in FIG. 2, the nonwoven 12 has more stiffness in the vertical direction.

Fibers which may be used in nonwovens according to the claimed invention are wide ranging and include any fibrous network which, when heated in an unmolded environment, will expand at least 5% in any direction (i.e., expansion in at least one of the vertical, horizontal, or lateral directions, and possibly all of these directions). The nonwoven can be obtained from a number of commercial sources, and may be in a vertically lapped configuration or random configuration. Vertically lapped (V-Lap) configurations may provide some advantages in terms of support when boards/blanks made of V-Lap are expanded in a mold and they are oriented in a direction which opposes, for example, the weight of a person's back or buttocks.

Nonwovens in the practice of this invention are typically fabricated from a mass of fibers which include binder fibers and one or more other fibers. The binder fibers have a melting temperature that is below the melting or decomposition temperature of the one or more other fibers, e.g., binder fibers typically have a melting temperature of 80-150 C. (polyesters are typical examples of binder fibers used in the production of nonwovens (examples of elastic polyester binder fibers include ELK®, E-PLEX®, and EMF type high elastic LMF are commercially available from Teijin Limited, Toray Chemical Korea Inc., and Huvis Corporation, respectively)). Once the binder fibers are melted, they will generally track along the outsides of the one or more other fibers, and, on cooling, will harden to produce the nonwoven which is essentially a mass of the one or more other fibers with adjacent fibers held together at various locations throughout the nonwoven by binder material which results from melting and re-hardening of the binder fibers. These nonwovens are often referred to as thermobonded nonwovens. The thermobonded nonwovens in the practice of this invention will have at least 5% by weight binder material, with 95% by weight being other materials including, for example, up to 95% by weight of the one or more other fibers. But they also may include other materials such as fire retardant compounds (e.g., phosphorus-containing FR chemicals/compounds, sulfur-containing FR chemicals/compounds, halogen-containing FR chemicals/compounds, and boron-containing FR chemicals/compounds. Examples of FR chemicals/compounds include, but are not limited to, phosphoric acid and its derivatives, phosphonic acid and its derivatives, sulfuric acid and its derivatives, sulfamic acid and its derivatives, boric acid, ammonium phosphates, ammonium polyphosphates, ammonium sulfate, ammonium sulfamate, ammonium chloride, ammonium bromide.), scented compounds, antimicrobial compounds or materials (e.g., silver particles or fibers), polymeric coatings, metal or ceramic particles; etc.

The ratio of binder material to the one or more other fibers in the nonwovens used in the practice of the invention can vary widely from 5% by weight binder material: up to 95% by weight one or more other fibers; 10% by weight binder material: up to 90% by weight one or more other fibers; 15% by weight binder material: up to 85% by weight one or more other fibers; 20% by weight binder material: up to 80% by weight one or more other fibers; 25% by weight binder material: up to 75% by weight one or more other fibers; 30% by weight binder material: up to 70% by weight one or more other fibers; 35% by weight binder material: up to 65% by weight one or more other fibers; 40% by weight binder material: up to 60% by weight one or more other fibers; 45% by weight binder material: up to 55% by weight one or more other fibers; 50% by weight binder material: up to 50% by weight one or more other fibers; 55% by weight binder material: up to 45% by weight one or more other fibers; 60% by weight binder material: up to 40% by weight one or more other fibers; 65% by weight binder material: up to 35% by weight one or more other fibers; 70% by weight binder material: up to 30% by weight one or more other fibers; 75% by weight binder material: up to 25% by weight one or more other fibers; etc. Depending on the application, the ratio may range from 5:95 to 95:5.

Examples of thermobonded nonwovens which may be used in the practice of this invention include but are not limited to:

any thermobonded nonwoven made with up to 95% of any denier, any fiber length, polyester fiber (Exemplary types of polyesters which may be used in the practice of the invention include, but are not limited to PET (polyethylene terephthalate), PTT (polytrimethylene terephthalate), and PBT (polybuthylene terephthalate);

any thermobonded nonwoven made with up to 95% of any denier, any fiber length, polyacrylonitrile fiber;

any thermobonded nonwoven made with up to 95% of any denier, any fiber length, polyvinyl alcohol fiber (PVA);

any thermobonded nonwoven made with up to 95% of any denier, any fiber length, polytetrafluoroethylene fiber (PTFE), like TEFLON for example;

any thermobonded nonwoven made with up to 95% of any denier, any fiber length, polyamide fiber, like nylon or perlon for example;

any thermobonded nonwoven made with up to 95% of any denier, any fiber length, wool fiber;

any thermobonded nonwoven made with up to 95% of any denier, any fiber length, coconut fiber;

any thermobonded nonwoven made with up to 95% of any denier, any fiber length, hemp fiber;

any thermobonded nonwoven made with up to 95% of any denier, any fiber length, flax fiber;

any thermobonded nonwoven made with up to 95% of any denier, any fiber length, jute fiber;

any thermobonded nonwoven made with up to 95% of any denier, any fiber length, cotton fiber;

any thermobonded nonwoven made with up to 95% of any denier, any fiber length, viscose fiber, like rayon for example;

any thermobonded nonwoven made with up to 95% of any denier, any fiber length, polyethylene fiber;

any thermobonded nonwoven made with up to 95% of any denier, any fiber length, polypropylene fiber;

any thermobonded nonwoven made with up to 95% of any denier, any fiber length, kevlar fiber;

any thermobonded nonwoven made with up to 95% of any denier, any fiber length, basofil fiber;

any thermobonded nonwoven made with up to 95% of any denier, any fiber length, belcotex fiber;

any thermobonded nonwoven made with up to 95% of any denier, any fiber length, nomex fiber;

any thermobonded nonwoven made with up to 95% of any denier, any fiber length, O-PAN fiber;

any thermobonded nonwoven made with up to 95% of any denier, any fiber length, Tencel fiber; and any thermobonded nonwoven made with up to 95% of a mixture of any of the fibers set forth above or any mixture of fibers with other fibers of interest (e.g. silver fibers for providing antimicrobial resistance, basalt fibers, natural fibers (e.g., cotton, ramie, coir, hemp, abaca, sisal, kapok, jute, flax, linen, kenaf, coconut fiber, pineapple fiber, wool, cashmere, and silk), man-made fibers (e.g., polyester, nylon, acrylics, acetate, polyolefins, melamin fibers, elastomeric fibers, polybenzimidazole, aramid fibers, polyimide fibers, modacrylics, polyphenylene sulfide fibers, oxidized PAN fiber, carbon fibers, novoloid fibers, manufactured cellulosic fibers (e.g., rayon, lyocell, bamboo fiber, Tencel, and Modal), and manufactured fire-retardant (FR) cellulosic fibers (e.g., Visil®, Anti-Fcell, Daiwabo's Corona. fibers, Anti-Frayon., Sniace's FR rayon, and Lenzing FR)).

It is also noted that hollow core fibers, e.g., hollow core polyethylene terephthalate (PET) may be used in nonwovens for use in the practice of the invention. In addition, nonwovens useful in the practice of the invention can be formed using composite fibers, sometimes referred to as sheath-core fibers. Binder fibers used to produce nonwovens useful in the practice of this invention include sheath-core fibers, where the sheath is polyester or some other low melting temperature material.

Examples of nonwovens that would not be usable in the practice of the invention include:

any thermobonded nonwoven made with a fiber that melts at an equal or lower temperature than the binder fiber's melt temperature; and any thermobonded nonwoven made with only binder.

Figure 3A:
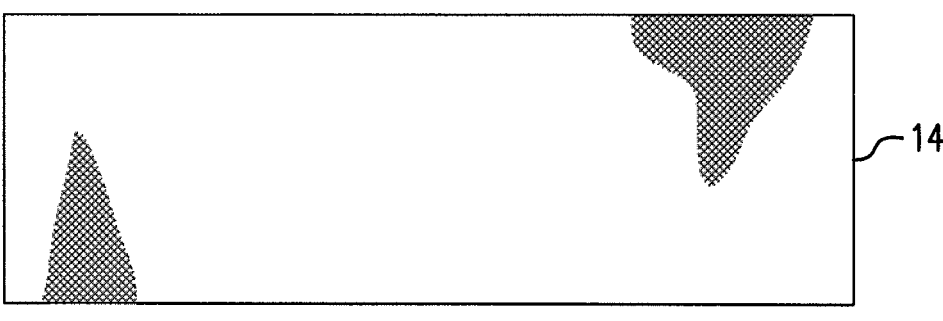
FIGS. 3a and 3b are schematic illustrations showing that the fibrous nonwoven material is densified and compressed after application of heat and pressure, followed by cooling to achieve hardening of the binder material while the fibrous nonwoven material is in its compressed state.
Figure 3B:
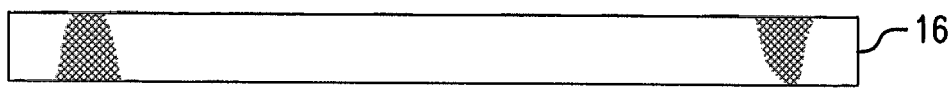

FIG. 3a schematically shows that the nonwoven 14 has a height dimension prior to compression. FIG. 3b schematically shows that after compression, the height dimension is substantially smaller, and the product from compression 16 is referred to herein as a "blank". In an embodiment of the invention, blanks are made by heating the nonwoven 14 above the melting temperature of the binding material which holds the fibers together and applying pressure to the nonwoven 14 in at least one dimension. After the nonwoven is compressed, the nonwoven is cooled to allow the binding material to re-harden (i.e., solidify) to hold the fibers together in a compressed state called a blank 16. The blank 16 might have a height dimension that is one half to one tenth (or even smaller) the height dimension of the nonwoven in its uncompressed state. The fibers in the blank 16 effectively have stored kinetic energy, as the orientation of the fibers in the blank 16 is not the natural orientation they are in when in the form of the manufactured nonwoven 14. While FIGS. 3A and 3B show compression in the height dimension, it should be understood that compression may be performed in any of the height, width, and length dimensions. Cooling of the blank 16 to harden the binding material can be performed simply by heat removal or by blowing air through the blank. All that is required, is to have the temperature decrease below the melting point temperature so that it re-hardens. As will be discussed below in more detail, blanks such as blank 16 can be laminated to other blanks and/or to non-expanding materials.

Figure 4A:
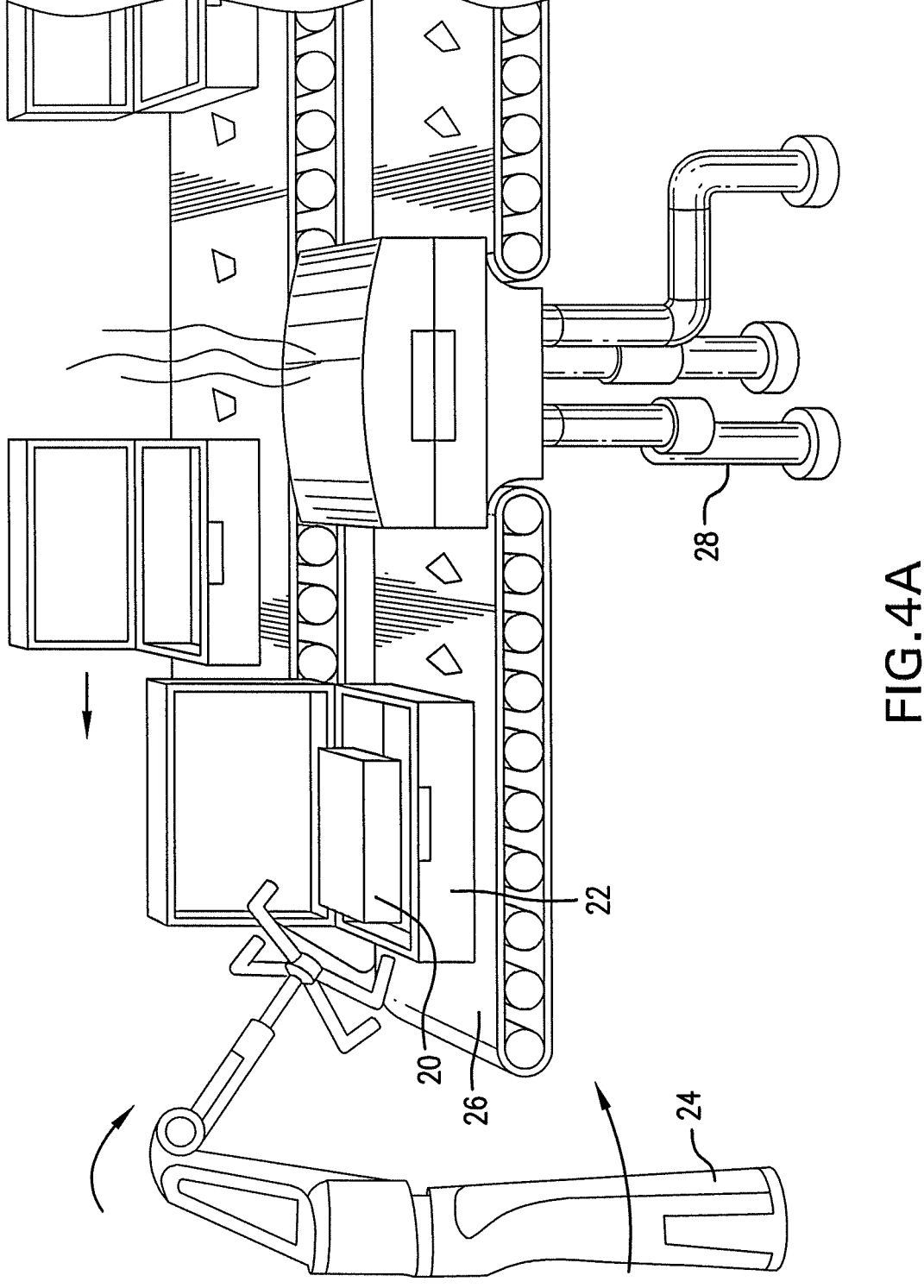
FIGS. 4a and 4b illustrate a simplified process methodology where the expandable material is placed in a mold for a mattress and is expanded through application of heat to form a mattress (or other desired three dimensional object) which can be retrieved from the mold.
Figure 4B:
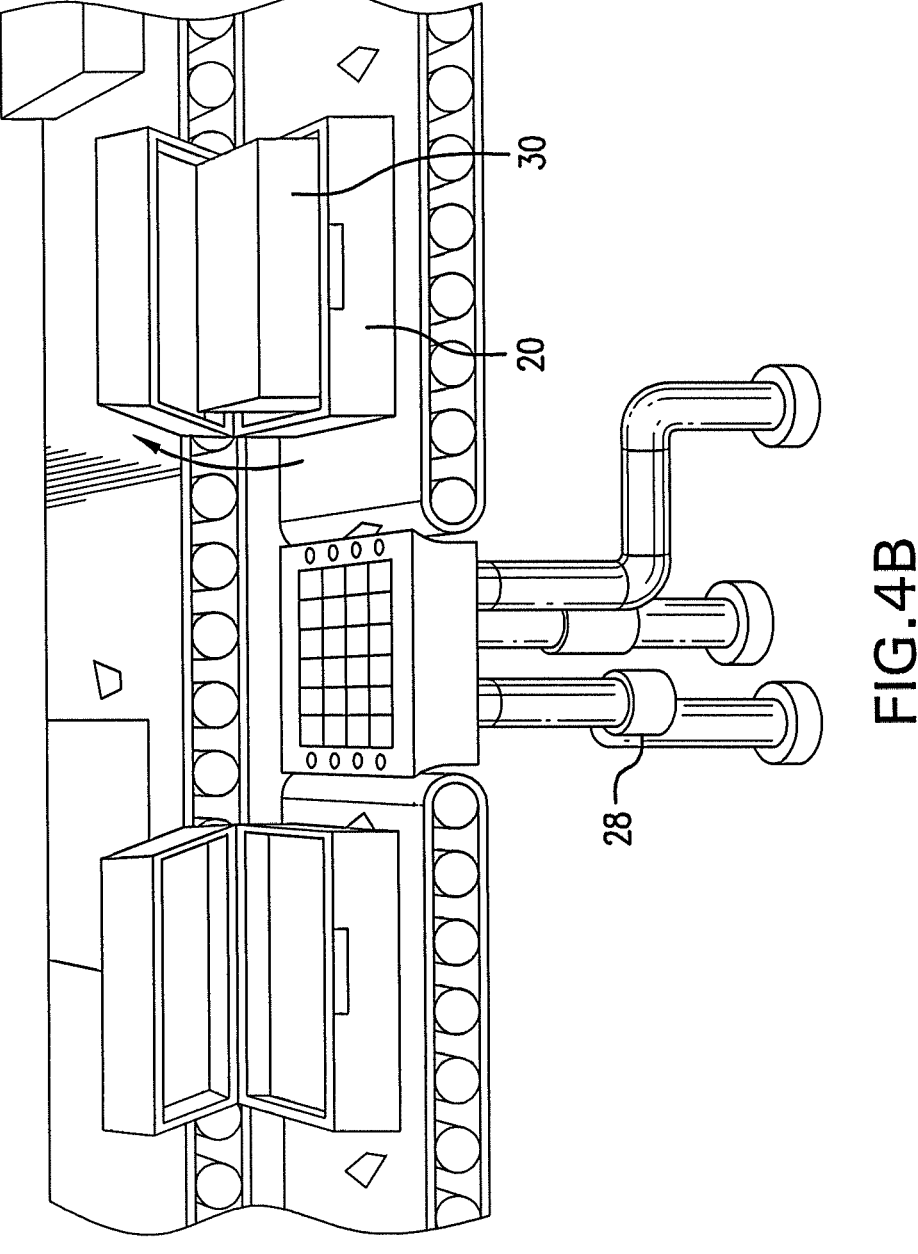

FIGS. 4A and 4B show a simplified production platform to make, for example, mattresses, according to an aspect of the invention (it being understood that most any other three dimensional object (e.g., car seats, etc.) can be manufactured by the same production platform using the same processes. In FIG. 4A, an expandable substrate 20 (e.g., a blank, a board, a cut part, and/or mixtures and multiples of the same is dropped into a mold 22. This can be done manually or by robotic arm 24. The mold 22 is shut and then transported, e.g., by conveyor 26) to a heating station 28. Heating station 28 is shown as a plurality of pipes which blow hot air and/or steam on the mold 22; however, the heating station 28 could be an oven or other device which can bring the substrate 20 up to a temperature above the melting temperature of the binding material in the expandable substrate 20. Once the binding material melts, the expandable substrate 20 is permitted to expand back towards its original state. In doing this, the substrate 20 expands to fill all or part of the mold (in FIG. 4B, it can be seen the entire mold was filled). FIG. 4b shows that after the mold 22 passes by the heating station 28, it is cooled and opened, and includes an expanded substrate 30. In a mattress manufacturing or seat back manufacturing process, the substrate 30 expands to fit the inner contours (flat, curved, etc.) of the mold 20. The cooling may be performed at the heating station using a blast of cold air or water, or simply by waiting for the mold 22 to cool down. During cooling, the binding material solidifies as the temperature dips below the melting point temperature. This holds the expanded material 30 together as a molded three dimensional article.

Figure 5A:
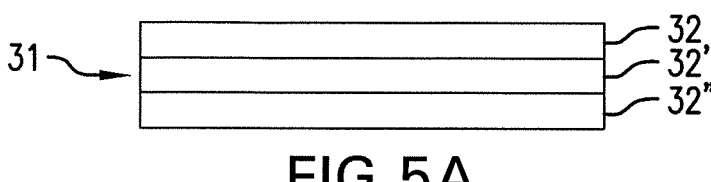
FIGS. 5a and 5b are schematics showing different laminated layups of expandable boards.

FIG. 5A shows an expandable substrate 31 in the form of a three layer board. The individual layers 32, 32', and 32" can be blanks such as described in FIG. 3b above which are laminated together. The blanks 32, 32', and 32" can have the same size and shape as shown in FIG. 5A, or they may have different sizes and shapes depending on the mold and the fabrication requirements for the article to be manufactured. In addition, the blanks 32, 32' and 32" may have the same fibers and binders as each other and same ratio of fibers and binders as each other. Alternatively, and depending on the desires of the fabricator, the blanks 32, 32' and 32" may have different ratios of fiber constitution to binder material or may have different fibers or groups of fibers in each layer. For example, one could have different blanks 32, 32', and 32" if there was a desire to have the bottom blank 32" expand less or more than the top blank 32.

Figure 5B:
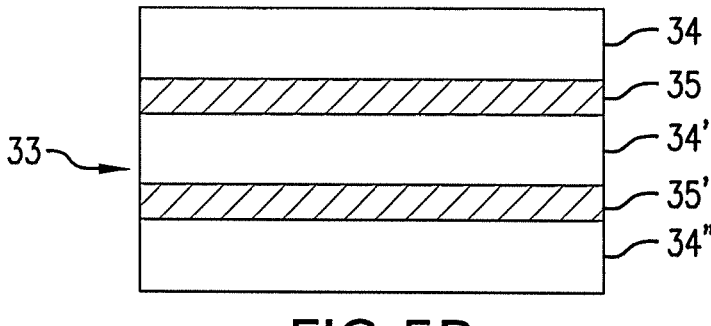

FIG. 5b shows an expandable substrate 33 in the form of a five layer board. Like FIG. 5A, expandable substrate 33 has three blanks 34, 34' and 34", and the blanks 34, 34', and 34" may be the same or different in terms of size, shape, fiber constitution, and ratio of fibers to binder material (in terms of weight percentage). However, FIG. 5b also includes non-expandable layers 35 and 35' which may be the same or different from each other. The non-expandable layers can be of almost any material including without limitation foam, fabric, rubber, metal, metal alloy, ceramic, straw and paper materials. These non-expandable layers may be chosen to provide different attributes to the three dimensional product being fabricated (e.g., stiffness, water resistance, fire resistance, magnetism, resistance to radiation, etc.). Each of the layers may be laminated together to form the expandable substrate 33 in board form. The expandable substrate 33 of FIG. 5b and the expandable substrate 31 of FIG. 5a may be molded in the same way that the expandable substrate 20 is in FIGS. 4a and 4b.

Figure 6:
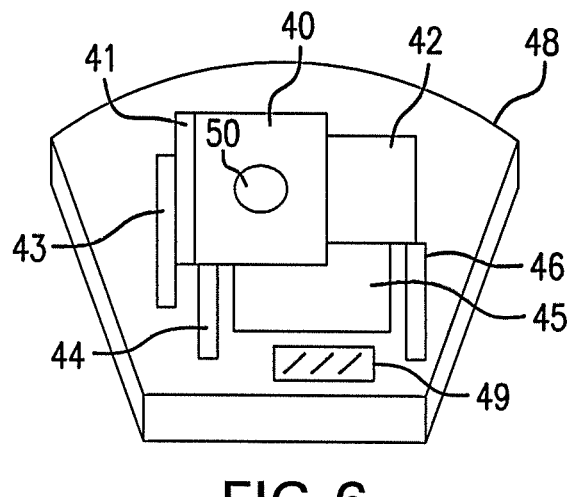
FIG. 6 shows a mold with some boards stacked on one another and others placed vertically within the mold.

FIG. 6 shows that a plurality of boards 40, 41, 42, 43, 44, 45, and 46 (or other expandable substrates) may be placed in a mold 48. They can be positioned on top of one another, or be oriented vertically. In mold 48, boards 40, 42, and 45 may expand vertically within the mold 48, while the vertically oriented boards 41, 43, 44, and 46 may expand laterally within the mold 48. The arrangement of boards within the mold can be neatly place or randomly oriented (e.g., dropped in). FIG. 6 also shows an expandable substrate in the form of a circular "part" 50. The part 50 can be made using a CNC machine, scissors, or some other cutting device which can cut a board to any desired shape (e.g., circular, polygonal, or amorphous). The part 50 can be adjacent a board 40, and have a different size than board 40. FIG. 6 demonstrates that virtually any expandable substrate 20 (blank, board, or part) according to the present invention can be molded, and that one or more expandable substrates can be used in any molding operation and that they can be put in the mold in specific orders (e.g., to achieve specific properties for the three dimensional object) or in random order and position. Also, from FIG. 6 it should be clear that non-expandable materials 49 might also be placed in areas of the mold 48 where the expandable substrates 20 will not expand to fill (e.g., a block of foam or piece of wood (see 49) might be positioned below board 45). These methods advantageously allow one to customize the final products to a desired characteristic such as size, feel, and firmness.

Figure 7:
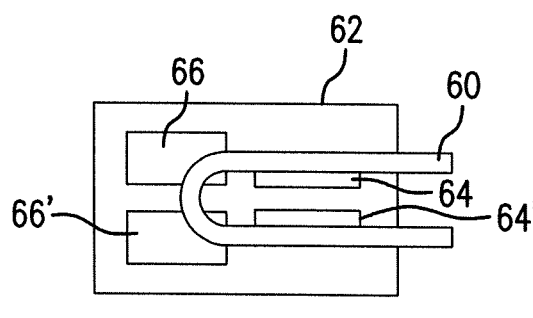
FIG. 7 shows a mold with a frame positioned in the mold with a plurality of boards therein.

FIG. 7 shows a frame 60 extending into a mold 62. Inside the mold are two vertically oriented boards 64 and 64' and two horizontally oriented boards 66 and 66'. As discussed above, boards 64 and 64' and 66 and 66' may be the same or different in terms of size, shape, constitution of fibers, or ratio of fibers to binder material (in terms of weight percentage). While FIG. 7 shows boards in the mold 62, other forms of expandable materials may also be used including parts 50 (see FIG. 6) or blanks (see FIG. 3b). The two horizontally oriented boards 66 and 66' are positioned respectively above and below the frame 60. The frame 60 may be metal, metal alloy, ceramic, wood, or some other non-expandable material. Once the boards in FIG. 7 are expanded, the three dimensional object which can be retrieved from the mold 62 will have the frame positioned therein. The frame 62 will adhere to or otherwise be attached to the expanded substrate.

In one embodiment, the three-dimensional composite according to the present invention is made according to a method comprising the following steps:

1) producing two or more blanks from nonwoven staple fibers and binder fibers;

2) compressing the two or more blanks to a predetermined thickness in the presence of heat to form a board;

3) cutting the board in a pre-determined two-dimensional shape to make a part; and 4) heating the part within a mold to create a three-dimensional composite.

In one embodiment, one or more specifically selected staple fibers, chosen in function of the properties of the final product are blended to form a controlled mass. The controlled mass is made with a specific weight concentration of the staple fibers and binder fibers. The staple fibers and the binder fibers are dosed such that the concentration of the binder fiber is from about 90% (wt %) to about 5% (wt %), e.g., from about 10%-80% binder fibers, e.g. preferably 70% (wt %). In one embodiment, the specifically selected binder fibers are elastomeric binder fibers and the staple fibers are polyester staple fibers. In another embodiment, the specifically selected baled binder fibers is low-melt bicomponent polyester staple fiber and the other selected baled staple fibers are polyester staple fibers. In yet another embodiment, there are two specifically selected baled binder staple fibers, i.e. a low-melt bicomponent polyester staple fiber and an elastomeric binder fiber, with another specifically selected baled staple fibers.

In some embodiments, other fibers in addition to the staple and binder fibers may be included in the blend. For example, additional cellulosic fibers such as rayon or viscose may be included. In some embodiments, fibers that have been treated to exhibit one or more properties such as hydrophobicity, hydrophilicity, and antimicrobial properties are included.

In one embodiment, one or multiple blanks are laid on top of one another, heated, then compressed, e.g. laminated, and cooled, e.g. via ambient air, to a consolidated desired thickness to make the boards. The blanks may be heated to a temperature of about 300-500° F., e.g. 350-350° F., or 390-425° F. In yet another aspect, the boards have a thickness less than the sum of the thickness of the blanks. In a further embodiment, the boards are cut into two-dimensional shapes to make the parts. The boards are cut into two-dimensional shapes using for example a die board and a hydraulic press or an automated 2-axis CNC cutter.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as support for the recitation in the claims of such exclusive terminology as "solely," "only" and the like in connection with the recitation of claim elements, or use of a "negative" limitation, such as "wherein [a particular feature or element] is absent", or "except for [a particular feature or element]", or "wherein [a particular feature or element] is not present (included, etc.) . . . ".

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

The invention is further described by the following non-limiting examples which further illustrate the invention, and are not intended, nor should they be interpreted to, limit the scope of the invention.

EXAMPLES

Example 1

To make an automotive seat cushion with a firm feel, three layers of 30% by weight of TEIJIN 6dtex×64 mm elastomeric binder staple fiber (ELK®) and 70% by weight of HUVIS 3d×51 mm hollow dry conjugated crimp polyester staple fiber, with 550 gram per square meter of the density and 30 mm of thickness were stacked one top of each other. The three layers were heated, compressed and cooled into one board with a thickness of approximately 30 mm. The board was cut to fit inside the outer dimensions of the seat cushion mold to make a part. The part was then placed inside the cushion mold cavity and the mold was closed and heated to 400° F. for 150 min, cooled at ambient temperature for 90 min for afford the formed automotive seat cushion.

Example 2

To make an automotive seat cushion with a plush feel, two layers of 30% by weight of TEIJIN 6dtex×64 mm elastomeric binder staple fiber (ELK®) and 70% by weight of HUVIS 3d×51 mm hollow dry conjugated crimp polyester staple fiber, with 550 gram per square meter of the density and 30 mm of thickness were stacked one top of each other. The two layers were heated, compressed and cooled into one board with a thickness of approximately 20 mm. The board was cut to fit inside the outer dimensions of the seat cushion mold to make a part. The part was then placed inside the cushion mold cavity and the mold was closed and heated to 400° F. for 150 min, cooled at ambient temperature for 90 min for afford the formed automotive seat cushion.

Example 3

To make an automotive seat backrest with stiff B-side, two (2) layers of 550 grams per square meter density, 30 mm thickness, 30% by weight of TEIJIN 6dtex×64 mm elastomeric binder staple fiber (ELK®) and 70% by weight of HUVIS 3d×51 mm hollow dry conjugated crimp polyester staple fiber were laid on top of one (1) layer of 400 grams per square meter density, 20 mm thickness, 30% by weight of HUVIS 4d×51 mm low-melt bicomponent coPET/PET sheath/core sheath melting point at 110° C. polyester staple fiber and 70% 6d×51 mm regenerated mechanical crimp polyester staple fiber. The three layers were heated, compressed and cooled to form a board of a thickness of approximately 30 mm. The board was cut to fit inside the outer dimensions of the seat backrest mold to make the part. The part was placed inside the seat backrest mold cavity and the mold was heated to 400° F. for 150 min, then cooled at ambient temperature for 90 min to afford the formed automotive backrest with stiff B-side.

Example 4

The same process as set forth in example 1, except:
1. Board was placed inside a mold
2. The mold itself was heated to 190° C.
3. 200° C. steam was injected into the mold
4. Step #2 and #3 were 120 sec
5. Demolding of the part took 40 sec

Example 5

The same process as set forth in example 2, except:
1. Board was placed inside a mold
2. The mold itself was heated to 190° C.
3. 200° C. steam was injected into the mold
4. Step #2 and #3 were 30 sec
5. Demolding of the part took 40 sec

Example 6

Three (3) layers of a 550 gram per square meter, 25 millimeter thickness, 70% 3D×51 mm hollow conjugated crimp polyester, 30% 6D×64 mm elastomeric binder fiber, are stacked on top of each other. They are heated, compressed and then cooled into a board with a final thickness of 25 millimeters. When this board is placed into a mold and heated, it expands, due to the before defined resilience of the original thermobond nonwoven, and fill the mold cavity. Once cooled, a 3D part is unmolded.

Example 7

The following is an example recipe for a mattress. Top section (A side): 4 layers of 300 gsm Blend: 70% 3d×51 mm hollow conjugated crimp polyester, 30% elastomeric binder fiber, loft: 25 mm. Middle section: 1 layer of 600 gsm, Blend: 70% 3d×51 mm hollow conjugated crimp polyester, 30% elastomeric binder fiber, loft: 27 mm. Lower section: 3 layers of 300 gsm Blend: 70% 3d×51 mm hollow conjugated crimp polyester, 30% elastomeric binder fiber, loft: 25 mm. Bottom section: 2 layer of 600 gsm, Blend: 70% 3d×51 mm hollow conjugated crimp polyester, 30% elastomeric binder fiber, loft: 27 mm. All these layers are heated, compressed and then cooled into a board with a final thickness of 80 millimeters. When this board is placed into a mold and heated, it expands but at different rates depending on the layer densities, and fill the mold cavity. Once cooled, a 3D part is unmolded but with different firmness throughout its final thickness.

Example 8

The following is an example recipe for a mattress. Three (3) layers of a 550 gram per square meter, 25 millimeter thickness, 70% 3D×51 mm hollow conjugated crimp polyester, 30% 6D×64 mm elastomeric binder fiber, are stacked on top of each other. Between the last layer and the two layers above it, a semi-permeable fabric, for example GOR-TEX, is placed. They are all heated, compressed and then cooled into a board with a final thickness of 25 millimeters. When this board is placed into a mold and heated with steam injection from the top layer going toward the bottom layer, it expands, but due to the presence of the semi-permeable fabric, the last layer expands at a different rate than the other two layers. Once cooled, a 3D part is unmolded but with one surface with a different firmness than the other surface.

The invention claimed is:

1. A multilayered substrate for molding an object, comprising:

at least one first layer formed as a thermobonded nonwoven material from a plurality of fibers and binder material joining together at multiple locations where one or more fibers of the plurality of fibers are adjacent to one another, wherein the thermobonded nonwoven material is configured in a vertically lapped configuration, wherein the binder material has a melting temperature below a melting or decomposition temperature of fibers in the plurality of fibers, wherein the thermobonded nonwoven material is present in a compressed state having first height, first length, and first width dimensions, wherein at least one of the first height, first length, and first width dimensions is or are smaller than a second height, a second length, and a second width dimension that the nonwoven would have in an uncompressed state, wherein, on heating, the at least one first layer expands at least 5% in one or more directions; and at least one second layer formed as a second thermobonded nonwoven material from a second plurality of fibers and binder material joining together at multiple locations where one or more fibers of the second plurality of fibers are adjacent to one another, wherein the second thermobonded nonwoven material is configured in a vertically lapped configuration, wherein the binder material has a melting temperature below a melting or decomposition temperature of fibers in the second plurality of fibers, wherein the second thermobonded nonwoven material is present in a compressed state having first height, first length, and first width dimensions, wherein at least one of the first height, first length, and first width dimensions is or are smaller than a second height, a second length, and a second width dimension that the second nonwoven would have in an uncompressed state, wherein, on heating, the at least one second layer expands at least 5% in one or more directions;

wherein the at least one first layer and the at least one second layer are joined or configured together as a multilayer substrate.

2. The multilayered substrate of claim 1 wherein the plurality of fibers of the thermobonded non-woven material or the second plurality of fibers of the second thermobonded non-woven material comprise one or more manufactured fibers selected from the group consisting of polyester fibers, nylon fibers, acrylics fibers, acetate fibers, polyolefin fibers, melamine fibers, elastomeric fibers, polybenzimidazole fibers, aramid fibers, polyimide fibers, modacrylic fibers, polyphenylene sulfide fibers, oxidized PAN fiber, carbon fibers, novoloid fibers, and manufactured cellulosic fibers.

3. The substrate of claim 1 wherein the plurality of fibers of the thermobonded non-woven material and the second plurality of fibers of the second thermobonded non-woven material both comprise polyester fibers.

4. The substrate of claim 1 wherein the plurality of fibers of the thermobonded non-woven material or the second plurality of fibers of the second thermobonded non-woven material comprise natural fibers selected from the group consisting of cotton fibers, ramie fibers, coir fibers, hemp fibers, abaca fibers, sisal fibers, kapok fibers, jute fibers, flax fibers, linen fibers, kenaf fibers, coconut fibers, pineapple fibers, wool fibers, cashmere fibers, and silk fibers.

\* \* \* \* \*